(12) United States Patent
Malone et al.

(10) Patent No.: US 6,267,217 B1
(45) Date of Patent: Jul. 31, 2001

(54) MODULAR CONSOLE ASSEMBLY FOR VEHICLES HAVING TRANSMISSION SHIFTER AND PARKING BRAKE MECHANISMS PRE-ASSEMBLED THERETO AND METHOD FOR MOUNTING THE CONSOLE ASSEMBLY TO A VEHICLE INTERIOR

(75) Inventors: Brian J. Malone, Hudsonville; Timothy J. Kelly; Marc R. Cogswell, both of Grand Rapids, all of MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 0 days.

(21) Appl. No.: 09/434,900

(22) Filed: Nov. 5, 1999

Related U.S. Application Data

(60) Provisional application No. 60/108,222, filed on Nov. 13, 1998.

(51) Int. Cl.[7] .................................................. B60K 20/04
(52) U.S. Cl. .................... 192/218; 74/473.15; 74/502.6; 29/469
(58) Field of Search ............................. 74/473.15, 473.3, 74/501.6, 502.6; 192/218; 296/37.14, 37.8; 29/469

(56) References Cited

U.S. PATENT DOCUMENTS

| | | |
|---|---|---|
| 4,453,759 | 6/1984 | Kathiria . |
| 4,690,448 | 9/1987 | Fujisawa . |
| 4,691,960 | 9/1987 | Miyardera . |
| 4,783,110 | 11/1988 | Beukema et al. . |
| 4,818,008 | 4/1989 | Cressoni . |
| 5,085,481 | 2/1992 | Fluharty et al. . |
| 5,106,143 | 4/1992 | Soeters . |
| 5,462,146 | * 10/1995 | Doolittle et al. ...................... 192/218 |
| 5,609,382 | 3/1997 | Schmid et al. . |
| 5,887,485 | * 3/1999 | VanOrder et al. ................ 74/473.15 |
| 5,970,814 | * 10/1999 | Smith et al. ....................... 74/473.15 |
| 5,992,264 | * 11/1999 | Brock, Sr. ........................... 74/502.6 |

* cited by examiner

*Primary Examiner*—Richard M. Lorence
(74) *Attorney, Agent, or Firm*—Rader, Fishman, Grauer & McGarry, An Office of Rader, Fishman & Grauer PLLC

(57) ABSTRACT

A console assembly is provided for mounting within a vehicle interior in an area between a pair of seats. A vehicle support member is provided on the vehicle interior having a quick connect fastener provided thereon. A carrier is adapted to mount to the vehicle support member and an operational lever is pivotally mounted on the carrier for movement between first and second positions. A quick connect fastener is connected to the operational lever at a lower portion thereof and is adapted to mate with the first quick connect fastener on the vehicle support member. The operational lever and carrier can thereby be assembled as a unit to the vehicle and the shift lever can be assembled to a vehicle shifting/braking mechanism through the quick connect fasteners.

41 Claims, 7 Drawing Sheets

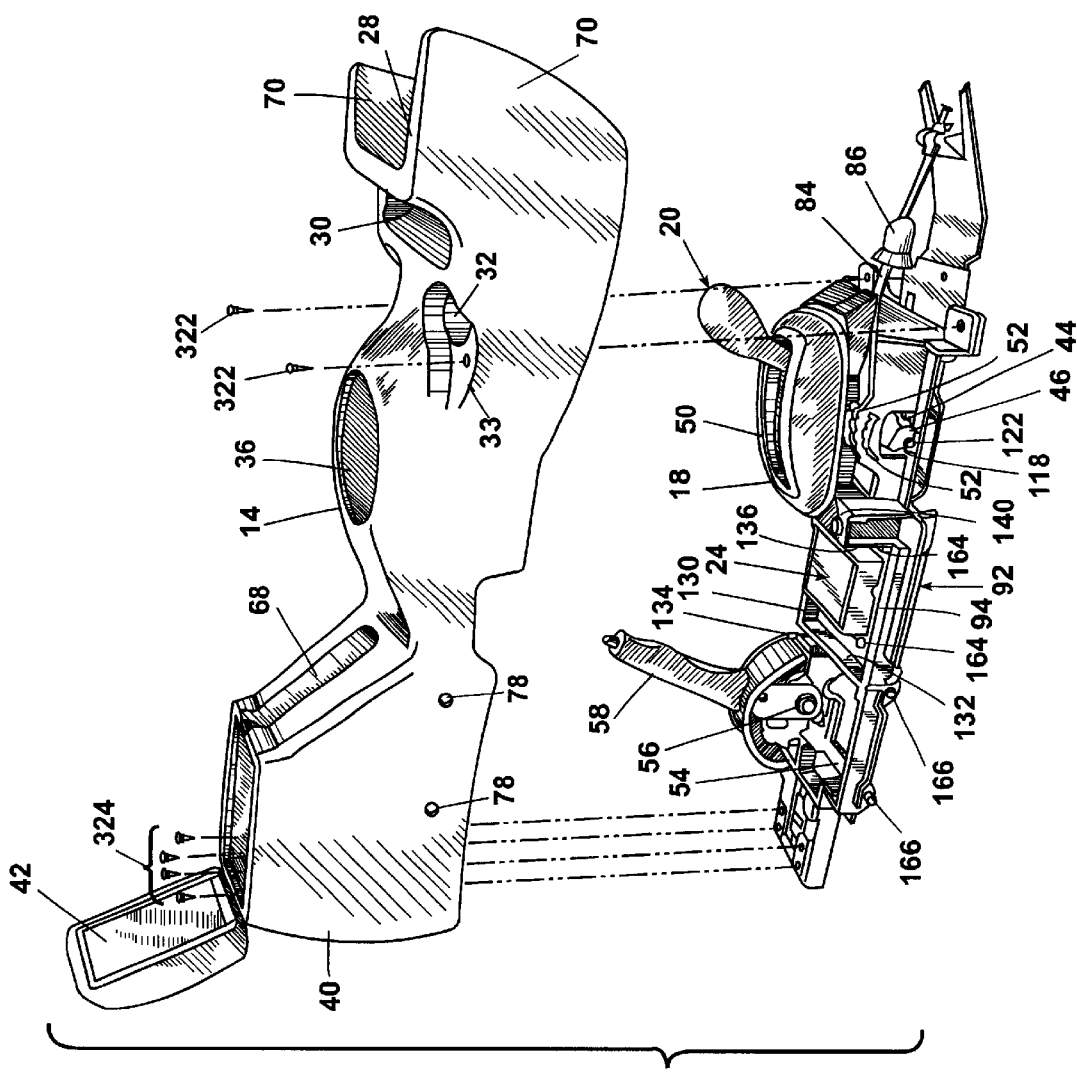

MODULAR CONSOLE ASSEMBLY FOR VEHICLES HAVING TRANSMISSION SHIFTER AND PARKING BRAKE MECHANISMS PRE-ASSEMBLED THERETO AND METHOD FOR MOUNTING THE CONSOLE ASSEMBLY TO A VEHICLE INTERIOR

CROSS-REFERENCE TO RELATED APPLICATION

This application claims the benefit of U.S. Provisional Application Ser. No. 60/108,222, filed on Nov. 13, 1998.

BACKGROUND OF THE INVENTION

1. Field of the Invention

The invention relates to a console assembly for a vehicle interior and, in one of its aspects, to a console assembly having transmission shifter and parking brake mechanisms mounted thereto prior to being mounted to the vehicle interior. In another aspect, the invention relates to a method for assembling the transmission shifter and parking brake mechanisms to the console assembly prior to installation of the console assembly within the vehicle interior and interconnection of the transmission shifter and parking brake mechanisms to the respective transmission shifter and parking brake components of the vehicle by quick-connect mechanisms.

2. Description of the Related Art

Vehicles and, more specifically, passenger vehicles typically include a console located between the front driver and passenger seats of the vehicle. FIG. 13 shows an exploded perspective view of a prior art console assembly 10 for mounting to a tunnel reinforcement member 12 of a vehicle interior. The console assembly 10 comprises a molded console member 14, a transmission shifter mechanism 16, a shifter bezel 18, a shifter knob 20, and a parking brake mechanism 22. In some cases, the console assembly 10 can also include an air bag module 24 for controlling the deployment of air bags in various areas of the vehicle.

The console member 14 typically comprises a forward end portion 26 having a flange 28 adapted to interengage with a dashboard portion (not shown) of the vehicle interior, an ashtray or other storage unit 30, and perhaps one or more container holders 32. The console member 14 can also have an intermediate portion 34 having an aperture 36 adapted to receive the shifter mechanism 16 and its associated components. Moreover, the console member 14 can include a rearward portion 38 typically provided with a storage compartment 40 having a lid 42 thereon and an aperture 68 adapted to receive a portion of the parking brake mechanism 22. The console member 14 is typically molded from a rigid synthetic resin material and is formed as an elongated shell.

The transmission shifter mechanism 16 typically comprises a bracket 44 having one or more mounting flanges 46 thereon adapted to receive fasteners for mounting the transmission shifter mechanism 16 to either the console member 14 or the tunnel reinforcement member 12 of the vehicle interior. The transmission shifter mechanism 16 also includes an upwardly-extending shifter rod 48 adapted to pass through the shifter bezel 18 and receive the shifter knob 20. When the shifter mechanism 16, shifter bezel 18, and shifter knob 20 are appropriately mounted between the tunnel reinforcement member 12 and the console member 14, an aesthetically-pleasing upper surface 50 of the shifter bezel 18 is positioned within the aperture 36 at the intermediate portion 34 of the console member 14. Typically, the shifter mechanism 16 also has a detent mechanism 52 for positioning the shifter rod 48 in a number of discrete positions—park, reverse, neutral, drive, and low gears for automatic transmissions and first through fifth and reverse for typical manual transmissions.

The parking brake mechanism 22 typically comprises a bracket 54 adapted to be mounted between the tunnel reinforcement member 12 and the console member 14 which includes a pivotal mounting 56 for a parking brake lever 58 as is conventionally known.

Also shown in FIG. 13 are a transmission actuator rod 60 and a parking brake actuator cable 62 each having well-known threaded portions 64 and 66, respectively, provided on the tunnel reinforcement member 12. The interconnections 64 and 66 of the transmission actuator rod 60 and parking brake actuator cable 62 are adapted to be interconnected to the transmission shifter mechanism 16 and parking brake mechanism 22, respectively.

Several problems and costs have arisen during the assembly and installation of the console assembly 10 to the tunnel reinforcement member 12 of a vehicle interior. This assembly typically requires several expensive and time-consuming steps: (1) the transmission shifter mechanism 16 is installed between the tunnel reinforcement member 12 and the console member 14; (2) the shifter mechanism 16 is interconnected to the transmission actuator rod 60 via the interconnection 64; (3) the parking brake mechanism 22 must be installed between the tunnel reinforcement member 12 and the console member 14 so that the parking brake lever 58 extends through the aperture 68 in the rearward portion 38 of the console member 14; (4) the parking brake lever 58 must be interconnected to the parking brake actuator cable 62 via the interconnection 66; (5) the air bag module 24 must be mounted between the tunnel reinforcement member 12 and the console member 14; (6) the console member 14 must be mounted to the tunnel reinforcement member 12 to enclose the transmission shifter mechanism 16 and its associated components, the parking brake mechanism 22 and the air bag module 24.

Manufacturing costs and installation problems have arisen due to the number of steps which must be performed on an automaker's assembly line to complete the installation of the console member 14 to the tunnel reinforcement member 12 as well as to install the transmission shifter mechanism 16, parking brake mechanism 22 and air bag module 24. These steps require several workers and several stations along the assembly line to complete an adequate installation. Further, the automaker must track several parts, namely, the components 14–24 as individual components to be installed within the vehicle interior creating inventory requirements as well as part tracking problems throughout the automaker's plant.

Interconnection of the transmission shifter mechanism 16 to the transmission actuator rod 60 and the parking brake mechanism 22 to the parking brake actuator cable 62 is often difficult due to space requirements as well as the awkward positioning of the console member 14 relative to the tunnel reinforcement member 12 within the confines of the vehicle interior on the automaker's assembly line.

Servicing the shifter mechanism 16, parking brake mechanism 22, and air bag module 24 within the console member 14 is also difficult because each of the components must be individually removed from the tunnel reinforcement member 12 to replace the defective component.

SUMMARY OF THE INVENTION

In one aspect, the invention relates to a console assembly for mounting to a vehicle support member in an area between a pair of seats and having a first quick connect fastener mounted thereto. The console assembly preferably has a carrier adapted to mount to a vehicle support member in an area between the seats and an operational lever pivotally mounted on the carrier for movement between first and second positions. A quick connect fastener is preferably connected to the operational lever at a lower portion thereof and adapted to mate with the first quick connect fastener on the vehicle support member. The operational lever and carrier can thereby be assembled as a unit to the vehicle and the shift lever can be assembled to a vehicle shifting/braking mechanism through the quick connect fasteners.

A housing can be mounted to the carrier and can cover a portion of the operational lever. The housing and carrier can thereby be assembled as a unit to a vehicle and thereafter the operational lever can be assembled to a vehicle transmission. The operational lever can comprise a transmission shift lever. The operational lever can also comprise a parking brake lever mounted to the carrier for pivotal movement between first and second positions. The housing can also cover at least a portion of the parking brake lever.

A third quick connect fastener can be connected to a lower portion of the parking brake lever and the vehicle support member further has a fourth quick connect fastener which is adapted to quick connect to the third quick connect fastener. The second quick connect can comprise a first flange mounted to the operational lever and the first quick connect comprises a second flange mounted to the shifting/braking mechanism on the vehicle and adapted to receive the first flange. The first flange is thereby received within the second flange when the shift lever is moved from the first position to the second position.

The parking brake lever can thereby be connected to a vehicle parking brake after the housing and parking brake lever are assembled to the vehicle by moving the parking brake lever from the first to the second positions. A detent mechanism can be provided on the housing and the carrier adapted to releasably retain the housing to the carrier without additional fasteners. The detent mechanism provides a releasable engagement between the housing and carrier during transportation thereof.

In another aspect, the invention relates to a console assembly for mounting to a portion of a vehicle in an area between a pair of seats comprising a carrier adapted to mount to a portion of a vehicle in an area between the seats. A transmission shift lever is pivotally mounted on the carrier for movement between first and second positions. A parking brake lever is also mounted to the carrier for pivotal movement between first and second positions. The assembly of the transmission shift lever, the parking brake lever and the carrier can thereby be mounted as a unit to the vehicle.

In a further aspect, the invention relates to a console assembly for mounting to a vehicle interior between a pair of vehicle seats comprising a housing having a wall adapted to face the vehicle interior and to be mounted to the vehicle interior. The housing can have a first opening and a second opening spaced from the first opening located in the wall. A transmission shift lever can be mounted to the housing, and provided with a quick connect fastener thereon and having a handle extending from the first opening in the housing. A parking brake lever can also be mounted to the housing, and provided with a quick connect fastener thereon and having a handle extending from the second opening in the housing. The quick connect fasteners on the transmission shift lever and the parking brake lever thereby register with a vehicle transmission and parking brake mechanisms when the housing is located between the pair of vehicle seats. The transmission shift lever and parking brake lever can thereby be pre-assembled to the housing before installation within the vehicle interior and the handles on the transmission shift lever and the parking brake lever extend from the respective first and second openings for grasping by an operator of the vehicle after the housing is mounted therein.

In yet another aspect, the invention relates to an improved console assembly for mounting to a vehicle interior support member between a pair of seats and having a quick connect receptor mounted to at least one of a transmission shift cable and a parking brake. The console assembly comprises an assembly having at least one of a transmission shift lever and a parking brake lever mounted thereto. The improvement in the console assembly comprises the at least one of a transmission shift lever and a parking brake lever has a quick connection thereon and is adapted to be received within the quick connect receptor on a corresponding one of a transmission actuator and a parking brake actuator when the console assembly is mounted to the vehicle interior support member.

The quick connection on the at least one of a transmission shift lever and a parking brake lever can be connected to the corresponding quick connection on the one of a transmission actuator and a parking brake actuator by movement of the at least one of a transmission shift lever and a parking brake lever. The at least one of a transmission shift lever and a parking brake lever can comprise a transmission shift lever and a parking brake lever.

In yet a further aspect, the invention relates to a vehicle with a passenger compartment having a pair of laterally spaced passenger seats and a console assembly located between the seats mounted to a vehicle support member. The console assembly can enclose at least one of a transmission shift lever and a parking brake lever pivotally mounted to the console assembly between a first and a second position.

The at least one of a transmission shift lever and a parking brake lever are preferably interconnected to a corresponding transmission and parking brake. An improvement in the vehicle having a console assembly being a first quick connect fastener is preferably connected to the at least one of a transmission shift lever and a parking brake lever, and a second quick connect fastener is preferably connected to the corresponding transmission and parking brake and adapted to mate with the first quick connect fastener. The mounting between the at least one of a transmission shift lever and a parking brake lever and the corresponding transmission and parking brake is thereby accomplished through the interengagement of the first and second quick connect fasteners without the use of additional tools by moving the at least one of a transmission shift lever and a parking brake lever from the first position to the second position.

A carrier can be provided for the vehicle which is adapted to mount to the vehicle support member between the seats, wherein the at least one of a transmission shift lever and a parking brake lever is pivotally mounted to the carrier. A housing can be mounted to the carrier and can cover a portion of the at least one of a transmission shift lever and a parking brake lever whereby the housing and carrier can be assembled as a unit to the vehicle. The at least one of a transmission shift lever and a parking brake lever can comprise a transmission shift lever and a parking brake lever mounted to the carrier for pivotal movement between first and second positions. A detent mechanism can be provided on at least one of the first and second quick connect fasteners to releasably retain the at least one of a transmission shift lever and a parking brake lever to the corresponding vehicle transmission and parking brake without additional fasteners.

In yet another aspect, the invention relates to a vehicle with a passenger compartment having a pair of laterally spaced passenger seats and a console assembly located between the seats mounted to a vehicle support member. The console assembly can enclose at least one of a transmission shift lever and a parking brake lever pivotally mounted to the console assembly between a first and a second position. The at least one of a transmission shift lever and a parking brake lever are thereby interconnected to a corresponding transmission and parking brake. The vehicle having the improved console assembly which facilitates installation thereof comprises a carrier adapted to mount to the vehicle support member between the seats. The at least one of a transmission shift lever and a parking brake lever is pivotally mounted to the carrier. The at least one of a transmission shift lever and a parking brake lever is mounted to the carrier prior to installation in the vehicle and the carrier need only be mounted between the seats in the vehicle to whereby the assembly of the carrier and the at least one of a transmission shift lever and a parking brake lever.

A housing can be mounted to the carrier and can cover at least a portion of the at least one of a transmission shift lever and a parking brake lever whereby the housing, the at least one of a transmission shift lever and a parking brake lever and the carrier can be assembled as a unit to the vehicle. The at least one of a transmission shift lever and a parking brake lever can comprise a transmission shift lever and a parking brake lever mounted to the carrier for pivotal movement between first and second positions. A first quick connect fastener can be connected to the at least one of a transmission shift lever and a parking brake lever. A second quick connect fastener can be connected to the corresponding transmission and parking brake and adapted to mate with the first quick connect fastener. A detent mechanism can be provided on at least one of the first and second quick connect fasteners to releasably retain the at least one of a transmission shift lever and a parking brake lever to the corresponding vehicle transmission and parking brake without additional fasteners.

In yet an additional aspect, the invention relates to a method for installing a console assembly within a vehicle interior for operably interconnecting at least one operational lever provided on the console assembly to a vehicle shifting/braking system. The at least one operational lever can be pivotally mounted to the console assembly for movement between a first position and a second position. The method preferably comprises the steps of providing a first quick connect fastener on the at least one operational lever for movement with the operational lever between the first and second positions; providing a second quick connect fastener on the vehicle shifting/braking system and adapted to be releasably interconnected to the first quick connect fastener; aligning the first and second quick connect fasteners by positioning the console assembly within the vehicle; and moving the operational lever from the first position to the second position wherein the first quick connect fastener is releasably engaged within the second quick connect fastener.

The method can also include the step of fixedly mounting the console assembly to the vehicle interior. The console assembly can comprise a housing releasably interconnected to a carrier. The method can also comprise the steps of mounting the at least one operational lever to the carrier; and mounting the carrier to the vehicle interior. The step of mounting the at least one operational lever to the carrier can occur before the step of mounting the carrier to the vehicle interior. The step of mounting the carrier to the vehicle interior can also occur before the step of moving the at least one operational lever from the first position to the second position to interconnect the first and second quick connect fasteners. The at least one operational lever can comprise a transmission shift lever and/or a parking brake lever.

Other objects, features, and advantages of the invention will be apparent from the ensuing description in conjunction with the accompanying drawings.

BRIEF DESCRIPTION OF THE DRAWINGS

In the drawings:

FIG. 11 is an exploded perspective view showing the removal of several fasteners and the disengagement of the snap-fit mounting between the console and the carrier assembly of FIG. 1 to expose the transmission shifter mechanism, parking brake mechanism and air bag module for servicing;

FIG. 12 is an enlarged view showing further detail of the snap-fit mounting between the carrier assembly and the console of FIG. 1.

DETAILED DESCRIPTION OF THE PREFERRED EMBODIMENTS

Figure 13:
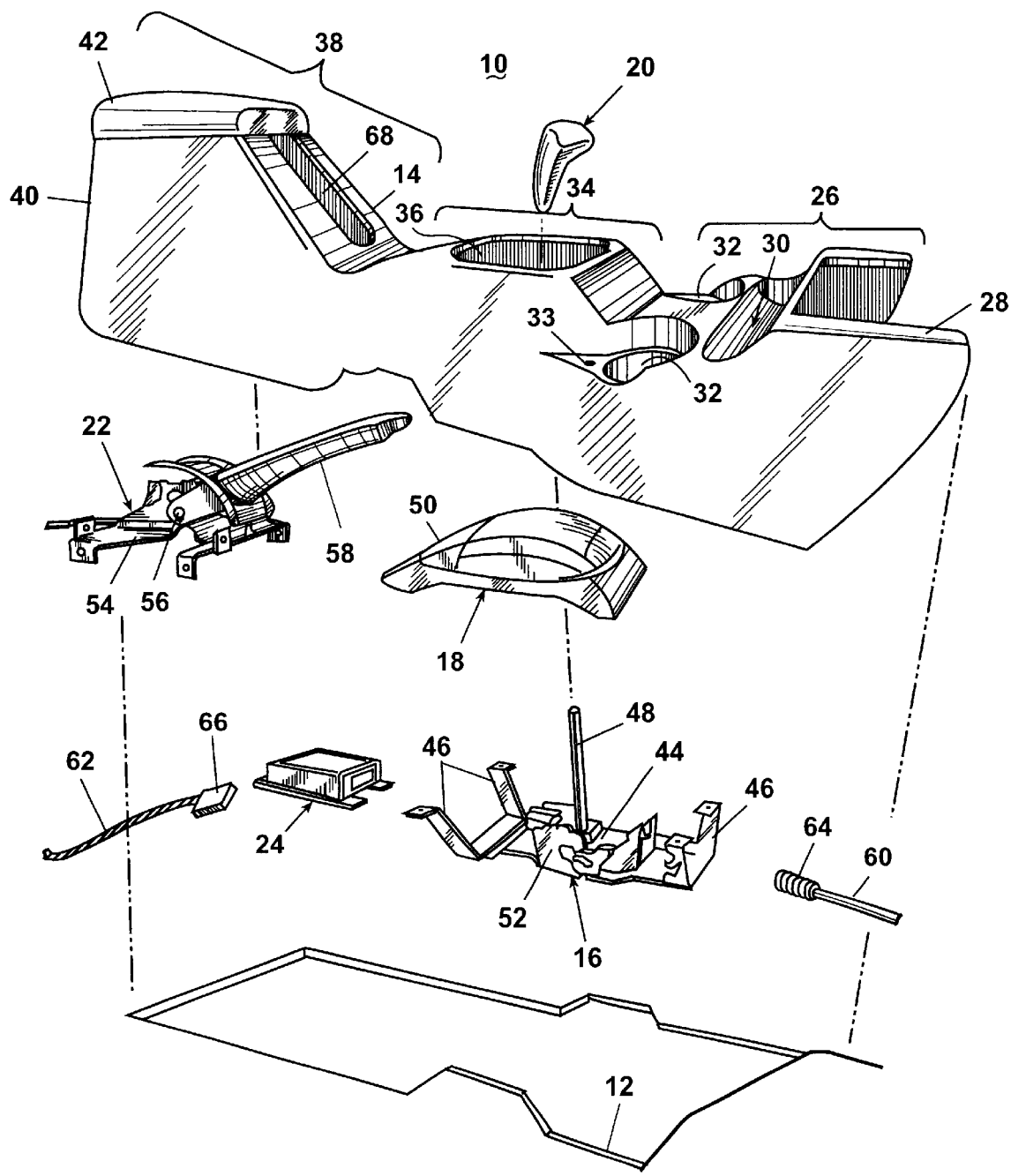
FIG. 13 is an exploded perspective view of a prior art console member and its associated shifter mechanism, parking brake mechanism and air bag module shown mounted individually between the console member and a tunnel reinforcement member for a vehicle.

Turning now to FIGS. 1–12, FIG. 1 in particular shows a console assembly 10 having a console member 14, transmission shifter mechanism 16, shifter bezel 18, shifter knob 20, and a parking brake mechanism 22 substantially as shown and described with respect to FIG. 13 in the Background section of this invention. The components 14–22 have been modified as described below in accordance with the invention. Moreover, it is an important feature of this invention that a carrier is provided for mounting the components 14–22 prior to installation of these components within a vehicle interior.

The carrier can either be formed as a separate component with respect to the console member 14 or, alternatively, the console member 14 and carrier can be integrally formed as a single unit whereby mounting brackets for the components 16–22 are formed within the console member 14. It will be understood that components of the console member 14, transmission shifter mechanism 16, shifter bezel 18, shifter knob 20 and parking brake mechanism 22 are shown and described in FIGS. 1–12 with the same reference numerals as shown in FIG. 13 to identify common components thereof.

Figure 1:
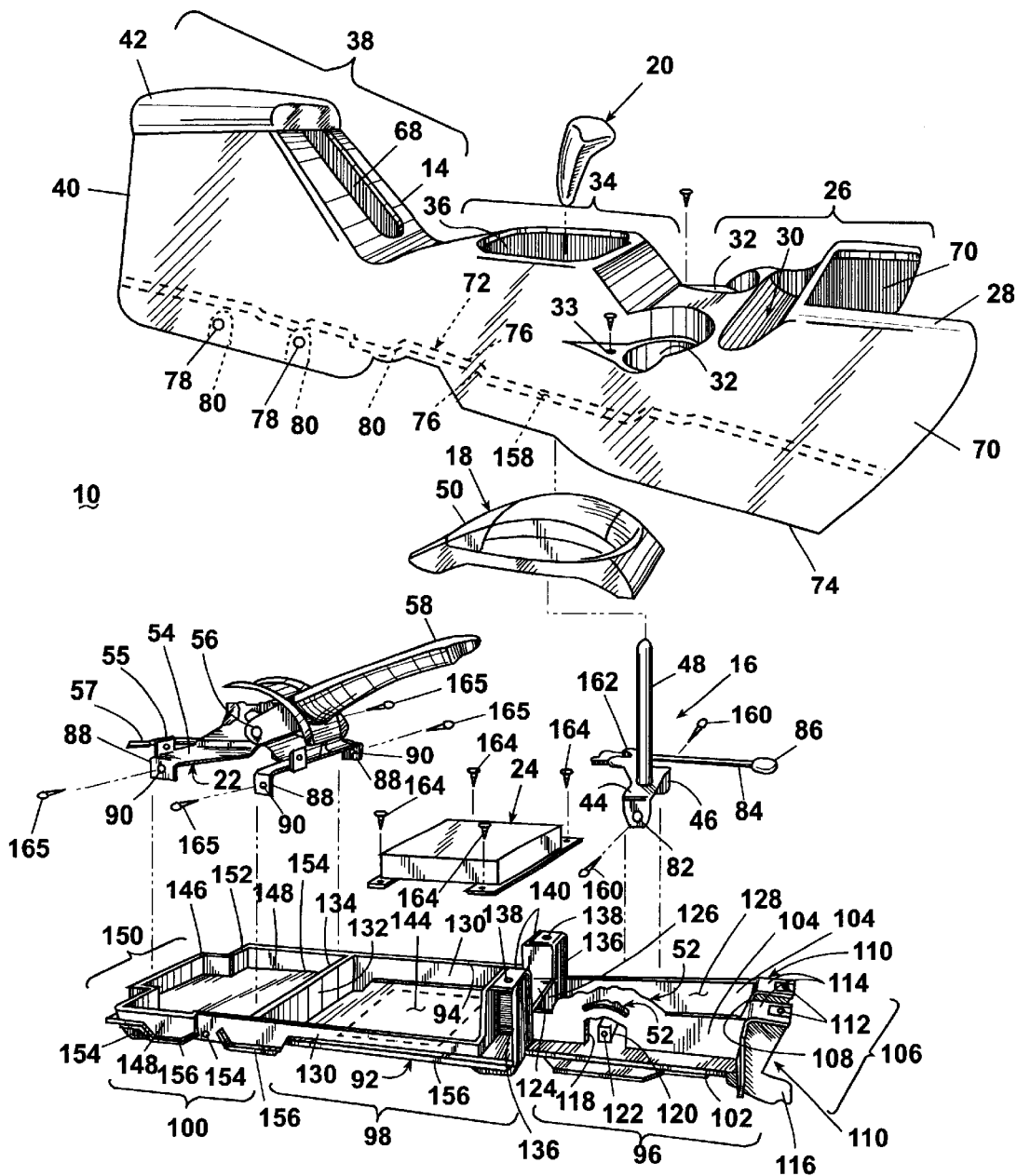
FIG. 1 is an exploded perspective view of the console assembly according to the invention and having the shifter mechanism assembly and parking brake mechanism assembly installed upon a carrier mounted to a console member so that all parts are enclosed in a modular fashion between the console member and the molded carrier and can be installed as a unit within a vehicle interior.

As shown in FIG. 1, the console member 14 includes a pair of elongated sidewalls 70, each of which are provided with a longitudinally-extending rail 72 adjacent a lower edge 74 thereof. The rail 72 preferably comprises a pair of protrusions 76 in spaced relationship to one another. It will be understood that the protrusions 76 can be interrupted, such as to pass around one or more apertures 78 located in the sidewall 70 which interrupt the path of the rail 72. Further, angular portions 80 of the protrusions 76 can be provided to traverse the apertures 78 and any other discontinuities in the sidewall 70 as required. The console member 14 is also provided with mounting apertures 33 located adjacent each container holder 32 at the intermediate portion 34 of the console member 14.

The transmission shifter mechanism 16 preferably has a bracket 44 with mounting flanges 46 provided with apertures 82 therethrough. Further, the transmission shifter mechanism 16 also includes a forwardly-extending actuator rod 84 which is provided with a connector 86 thereon.

The parking brake mechanism 22 preferably has a bracket 54 provided with mounting flanges 88 at spaced locations thereon, each of which is provided with an aperture 90 therethrough. The parking brake mechanism 22 is also provided with an actuator rod 55 provided with a connector 57 thereon.

A carrier 92 is provided, preferably formed from a synthetic resin material, for mounting the shifter mechanism 16, shifter bezel 18, and parking brake mechanism 22 thereto prior to receiving the console member 14 thereon. Further, the assembly of the console member 14 to the carrier 92 (with attached components 16–22) can be assembled as a unit at an off-site location whereby it, upon delivery to an automaker's plant, can be installed as a unit within a vehicle interior in an easy and efficient manner. The carrier 92 preferably comprises an elongated member 94 having a forward portion 96, an intermediate portion 98 and a rearward portion 100.

The forward portion 96 includes a platform 102 having a pair of upstanding sidewalls 104 adjacent each longitudinal edge thereof. A forward end 106 of the elongated member 94 is provided with a terminal wall 108 having a pair of forwardly-extending flanges 110, each provided with a mounting aperture 112 on an upper surface 114 thereof. Each of the flanges 110 can be provided with a cut-out portion 116 adapted to correspond with any discontinuous dashboard features of the vehicle interior (not shown).

At least one of the sidewalls 104 can be provided with an aperture 118 which is aligned with a mounting flange 120 provided on the platform 102 and having apertures 122 provided on ends thereof adapted to receive the transmission shifter mechanism 16. It can be seen from an examination of at least one of the sidewalls 104 of the elongated member 94 that a detent mechanism 52 typically provided with the transmission shifter mechanism 16 can be provided on the sidewall 104 for the purpose of engaging the upwardly-extending shifter rod 48 on the transmission shifter mechanism 16 and retaining the shifter rod 48 in a particular discrete position corresponding to the gear on the transmission (not shown). A rearward end 124 of the forward portion 96 of the elongated member 94 also includes a terminal wall 126 which, together with the sidewalls 104 and terminal wall 108 located oppositely therefrom, defines a forward chamber 128 adapted to receive at least a portion of the transmission shifter mechanism 16.

The intermediate portion 98 of the elongated member 94 of the carrier 92 includes a pair of sidewalls 130 which extend between the terminal wall 126 located at the rearward end 124 of the forward portion 96 and a terminal wall 132 located at a rearward portion 134 of the intermediate portion 98 of the carrier 92. As can be seen from FIG. 1, a pair of upstanding flanges 136 having mounting apertures 138 on an upper surface 140 thereof are located adjacent the terminal wall 126 located at the rearward end 24 between the forward and intermediate portions 96 and 98, respectively. An intermediate chamber 144 is defined between the sidewalls 130 and terminal walls 126 and 132.

The rearward portion 100 of the carrier 92 comprises a platform 146 defined by sidewalls 148, the terminal wall 132 at the rearward portion 134 of the intermediate portion 98 and a rearward end 150 of the rearward portion 100 of the carrier 92. The sidewalls 148, rearward end 150 and terminal wall 132 define a rearward chamber 152 together with the platform 146. As can be seen from FIG. 1, the sidewalls 148 of the carrier 92 are provided with apertures 154 therein.

Portions of the sidewalls 130 and 148 of the intermediate end rearward portions 98 and 100, respectively, are provided with a laterally-extending rail 156. Preferably, the rail corresponds in configuration to a gap 158 defined between the protrusions 76 of the rail 72 located on the sidewall 70 of the console member 14. The rail 156 and rail 72 are provided for the purposes of a snap-fit engagement between the console member 14 and the carrier 92 during shipping and after installation of the console assembly within a vehicle interior.

The transmission shifter mechanism 16 is assembled to the forward portion 96 of the carrier 92 by passing fasteners 160 through the apertures 82 in the mounting flanges 46 of the bracket 44 of the transmission shifter mechanism 16 so that the shifter rod 48 is pivotally mounted to the mounting flange 120 by fasteners 160. Preferably, a pin 162 is provided on the shifter mechanism 16 to engage the detent mechanism 52 on at least one of the sidewalls 104 at the forward portion 96 of the carrier 92 so that the shifter rod 48 can be selectively positioned therein as has been described.

The air bag module 24 can be installed to the tunnel reinforcement member 12 of the vehicle interior by conventional fasteners 164. Typically, the air bag module 24 is installed to the tunnel reinforcement member 12 on an assembly line prior to installation of the console member 14 thereto.

The parking brake mechanism 22 is mounted upon the platform 146 at the rearward portion 100 of the carrier 92 by fasteners 165 which pass through the apertures 154 in the sidewalls 148 and through the aperture 90 in the mounting flanges 88 on the bracket 54 of the parking brake mechanism 22.

When the transmission shifter mechanism and parking brake mechanism 16 and 22 are so mounted, the actuator rod 84 preferably extends forwardly beyond the forward end 106 of the carrier 92 and the actuator rod 55 of the parking brake mechanism 22 extends rearwardly beyond the rearward end 150 of the carrier 92 to facilitate interconnection of the connectors 86 and 57, respectively, thereon to the corresponding transmission actuator rod 60 and parking brake actuator cable assemblies 62 in the vehicle. The shifter bezel can be mounted atop the shifter mechanism so that the shifter rod 48 extends through the shifter bezel 18 and can be mounted to the shifter knob 20 in a conventional manner.

In this manner, the shifter mechanism 16, shifter bezel 18, shifter knob 20 and parking brake mechanism 22 are conveniently mounted to the carrier 92. This pre-assembly can preferably occur away from the automaker's plant so that the automaker is not required to track each of the individual components. Rather, the full assembly can be tracked as a single product, thus reducing costs and increasing efficiency.

The console member 14 is preferably mounted to the carrier 92 prior to shipment from the off-site manufacturer to the automaker's plant. To quickly and temporarily assemble the console member 14 to the carrier 92 (with its components 16–22 assembled thereto), the console member is passed over the carrier 92 so that the protrusions 76 on the rail 72 located on the interior of the sidewall 70 of the console member 14 are located on either side of the rail 156 on the sidewalls of the carrier 92 in a snap-fit engagement. Thus, the entire console assembly can be pre-assembled at the off-site manufacturer's plant and shipped to the automaker's plant as a single unit.

Once the console assembly is received at the automaker's plant, it can be conveniently assembled to the tunnel reinforcement member 12 of a vehicle interior in a simple and efficient manner without requiring the extensive part tracking, assembly line workstations, and extra workers normally required to install each of the above-described components individually to the vehicle interior. Before describing the assembly of the console to the vehicle interior, the connector 86 of the transmission shifter mechanism 16 and the connector 57 of the parking brake mechanism 22 will be described in greater detail with regard to FIGS. 5–6 for the connector 86 and FIGS. 7–8 for the connector 57, respectively. It is these connectors 86 and 57 which provide even greater flexibility in installing the console assembly to the vehicle interior without requiring a great deal of maneuvering and positioning of the carrier 92 with respect to the vehicle transmission actuator 60 and parking brake actuator cable 62 assemblies, respectively.

Figure 5:
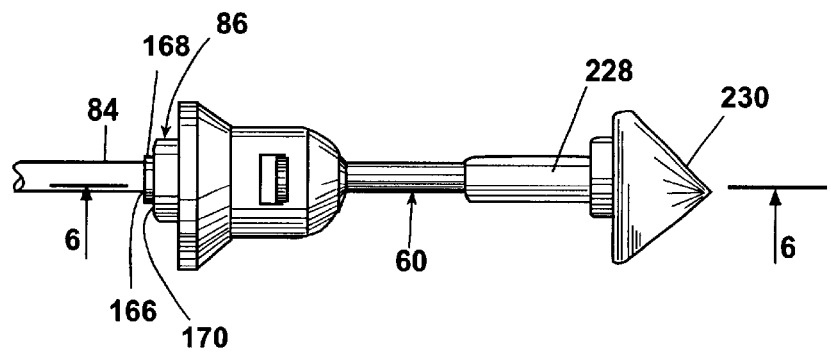
FIG. 5 is an exploded perspective view showing the insertion of quick connections on the transmission shifter rod of FIG. 4 into quick connections on the transmission actuator rod.
Figures 6, 8:
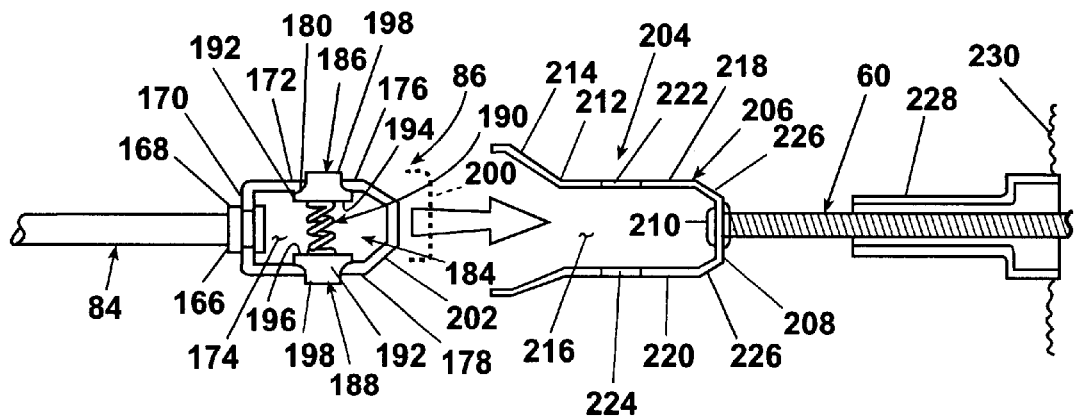
FIG. 6 is a cross section taken along lines 6—6 of FIG. 5 showing the quick connections on the transmission shifter rod being inserted within the quick connections on the transmission actuator rod.
FIG. 8 is a cross section taking along lines 8—8 of FIG. 7 showing the quick connections on the parking brake shifter rod being inserted within the quick connections on the parking brake actuator cable.

FIGS. 5–6 illustrate the interconnection between the transmission shifter mechanism 16 and a transmission actuator rod 60. It will be understood that, when the transmission shifter mechanism 16 is interconnected with the transmission actuator rod 60, the shifter rod 48 of the transmission shifter mechanism 16 can be moved in a conventional manner by a vehicle occupant to control the transmission of the vehicle. This invention provides a novel mechanism and method for interconnecting the transmission shifter mechanism 16 to the transmission actuator rod 60.

As described above, the connector 86 is mounted to a distal end 166 of the actuator rod 84 by a mounting nut 168 which mounts the distal end 166 of the actuator rod 84 to a rearward surface 170 of the connector 86. The connector 86 comprises a body 172, of which the rearward surface 170 forms a part thereof, which defines an interior chamber 174 therein. The body 172 has opposing surfaces 176 and 178 which have aligned apertures 180 and 182, respectively. A retainer 184 is provided within the interior chamber 174 of the body 172 which comprises a pair of opposed flanges 186 and 188 and spring 190.

Each flange 186 and 188 comprises a body 192 wherein the spring 190 is mounted to opposing interior surfaces 194 and 196 thereof. Each body 192 also includes an outwardly-extending protrusion 198 thereon which is sized approximately to that of the apertures 180 and 182 in the body 172. The spring 190 thereby biases the protrusions 198 on the flanges 186 and 188 outwardly of their respective apertures 180 and 182. A forward portion 200 of the body 172 is preferably provided with a tapered surface to facilitate insertion of the body 172 into a receptacle.

The transmission actuator rod 60 is also preferably provided with a connector 204 which comprises a body 206 having a forward surface 208 mounted to the transmission actuator rod 60 by a mounting nut 210. The body 206 also preferably has a rearward portion 212 provided with a radially-extending frustoconical surface 214 concentrically aligned with the remainder of the body 206. The body 206 is preferably formed as a shell which defines an interior chamber 216 therein. The body 206 is provided with opposing surfaces 218 and 220 having aligned apertures 222 and 224, respectively. The apertures 222 and 224 are preferably sized so as to conform substantially to the shape of the protrusions 198 on the flanges 186 and 188 of the retainer 184 of the connector 86. The forward surface 208 can be interconnected with the opposed opposing surfaces 218 and 220 by chamfered portions 226 which preferably conform in shape to the tapered surface 202 on the connector 86.

The transmission actuator rod 60 can be directed toward the appropriate transmission actuator components (not shown) within the vehicle by a sleeve 228 mounted to the vehicle interior, shown generally at 230 in FIG. 5. Thus, the connector 86 of the transmission shifter actuator rod 84 can be securely mounted to the connector 204 of the transmission actuator rod 60 by positioning the connector 86 with respect to the connector 204 as shown in FIG. 6 and urging the connector 86 within the interior chamber 216 of the connector 204. As the body 172 of the connector 86 passes within the interior chamber 216 of the connector 204, the protrusions 198 on the opposing flanges 186 and 188 are biased inwardly against interior surfaces of the connector 204 so they are urged within the interior chamber 174 of the body 172. As the body 172 passes further within the interior chamber 216 of the connector 204 so that the forward portion 200 of the body 172 approaches an interior surface of the forward surface 208 of the body 206, the opposing flanges 186 and 188 of the retainer 184 are aligned with the opposing apertures 222 and 224 of the respective surfaces 218 and 220. When the alignment is complete between the flanges 186 and 188 and the apertures 222 and 224, the spring 190 acts to bias the flanges 186 and 188 outwardly so that each protrusions 198 thereof is securely positioned within a corresponding aperture 222 and 224 to fixedly secure the connector 86 within the connector 204. Thus, the shifter actuator rod 84 is securely mounted to the transmission actuator rod 60 as shown in FIG. 5.

Figure 7:
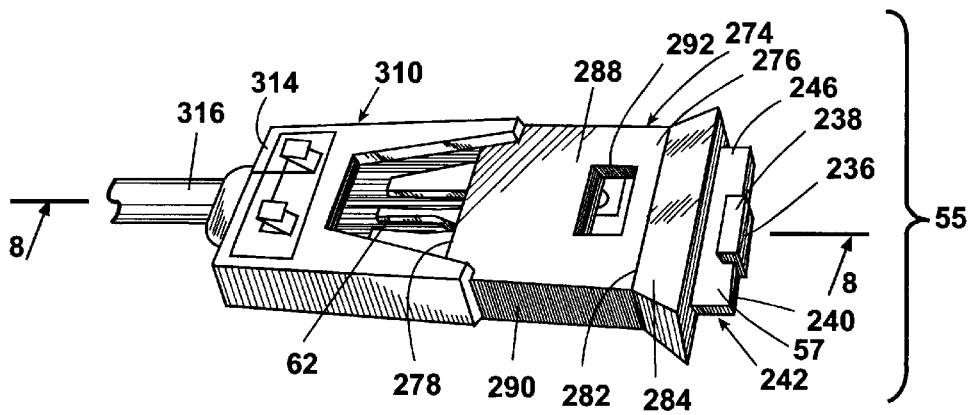
FIG. 7 is an exploded perspective view showing the insertion of quick connections on the parking brake shifter rod of FIG. 4 into quick connections on the parking brake actuator cable.

FIGS. 7–8 illustrate the interconnection between the parking brake mechanism 22 and a parking brake actuator cable 62. It will be understood that, when the parking brake mechanism 22 is interconnected with the parking brake actuator cable 62, the parking brake lever 58 of the parking brake mechanism 22 can be moved in a conventional manner to control the parking brake of the vehicle. This invention provides a novel mechanism and method for interconnecting the parking brake mechanism 22 to the parking brake actuator cable 62.

As described above, the connector 57 is mounted to a distal end 236 of the actuator rod 55 by a mounting nut 238 which mounts the distal end 236 of the actuator rod 55 to a forward surface 240 of the connector 57. The connector 57 comprises a buckle-like planar body 242 of which the forward surface 240 forms a part thereof. The body 242 has opposing surfaces 246 and 248 through which an aperture 250 extends. A rearward portion 270 of the body 242 is preferably provided with a tapered surface to facilitate insertion of the body 242 into a receptacle.

The parking brake actuator cable 62 is also preferably provided with a connector 274 which comprises a body 276 having a rearward surface 278 mounted to the parking brake actuator cable 62 by a mounting nut 280. The body 276 also preferably has a forward portion 282 provided with a laterally-extending trapezoidal surface 284 centrally aligned with the remainder of the body 276. The body 276 is preferably formed as a shell which defines an interior chamber 286 therein. The body 276 is provided with opposing surfaces 288 and 290. The surface 288 has an aperture 292 and the surface 290 has a spring 294 located in the chamber 286. The spring 294 is mounted to an interior surface of the body 272 and comprises an arm 296 bent at a vertex 298 so that the arm is resiliently biased upwardly into the chamber 286. The spring 294 is mounted to the body 272 by a fastener 300. A stop member 302 is located rearwardly of the spring 294 to define a rearwardmost limit of the connector 57 relative to the connector 274. The connector 57 of the parking brake actuator rod 55 can be securely mounted to the connector 274 of the parking brake actuator cable 62 by positioning the connector 57 in axial alignment with respect to the connector 274 as shown in FIG. 8 and urging the connector 57 within the interior chamber 286 of the connector 274.

As the body 242 of the connector 57 passes within the interior chamber 286 of body 276 of the connector 274, the arm 296 of the spring 294 is biased downwardly toward the interior surface of the connector 274 by the rearward portion 270 of the connector 57. As the body 242 passes further within the interior chamber 286 of the connector 274 so that the rearward portion 270 of the body 242 approaches the stop member 302, the arm 296 of the spring 294 becomes aligned with the aperture 250 of the body 242 of the connector 57. When the alignment is complete between the arm 296 of the spring 294 and the aperture 250, the spring 294 biases the arm 296 upwardly so that the arm 296 is located within the aperture 250 to secure the connector 57 within the connector 274. Thus, the parking brake actuator rod 55 is securely mounted to the parking brake actuator cable 62 as shown in FIGS. 7–8.

A guide 310 can be provided which restricts the movement of the connector 274 to linear or axial movement within the guide 310. The guide 310 preferably comprises a sleeve 312 having a rearward end 314 mounted to a conduit 316 which receives the parking brake actuator cable 62 therein. An opposite end of the conduit 316 is mounted to the vehicle interior (not shown in FIGS. 7–8). Therefore, as the connector 274 is moved as a result of actuation of the parking brake mechanism 22, the connector 274 can slide in a linear direction relative to the parking brake actuator cable 62 to prevent any binding or twisting thereof during actuation of the vehicle parking brake.

Figure 2:
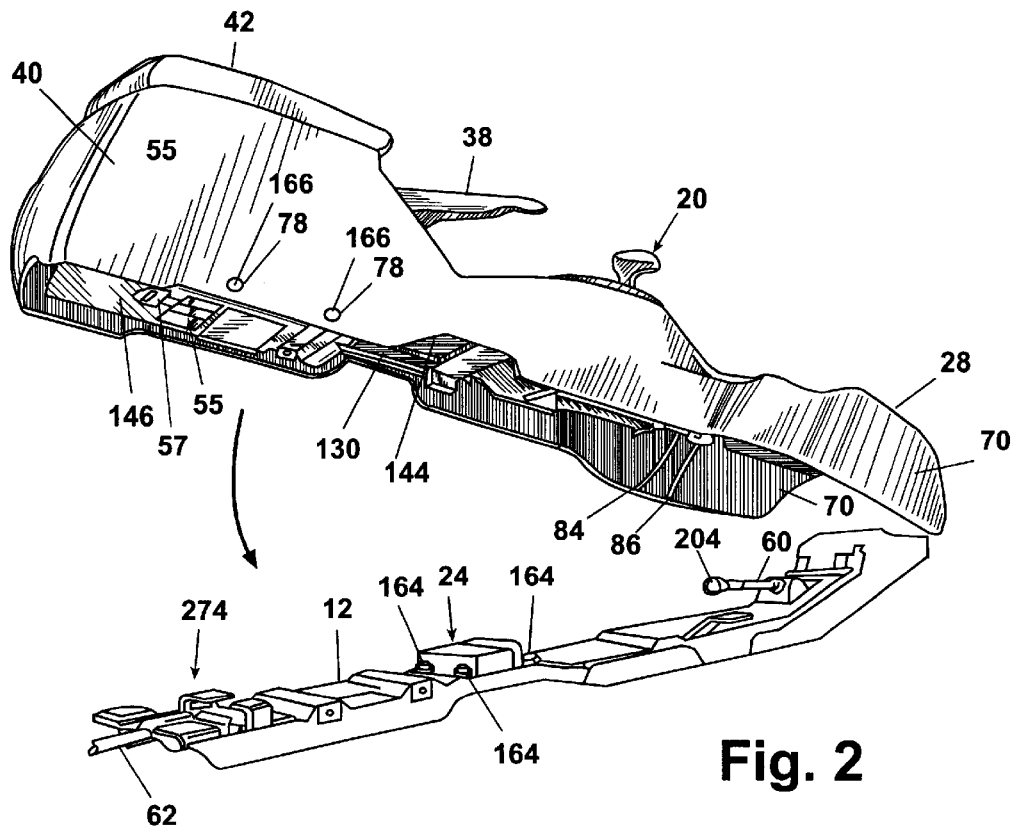
FIG. 2 is an exploded perspective view of the assembled console and carrier assembly of FIG. 1 positioned above a typical tunnel reinforcement member in a vehicle interior.

An important feature of this invention is that the console assembly is easily mounted within a vehicle interior without requiring a great deal of parts, workers or time to accomplish this task. FIG. 2 shows the console assembly 10 positioned over a typical tunnel reinforcement member 12 in a vehicle interior. As can be seen from an examination of FIG. 2, the console assembly is positioned so that the forward end portion 26 of the console member is positioned over the tunnel reinforcement member 12 so that the connector 86 on the transmission shifter actuator rod 84 is aligned with the connector 204 on the transmission actuator rod 60 and the connector 57 on the parking brake actuator rod 55 is aligned with the connector 274 on the parking brake actuator cable 62.

Figure 3:
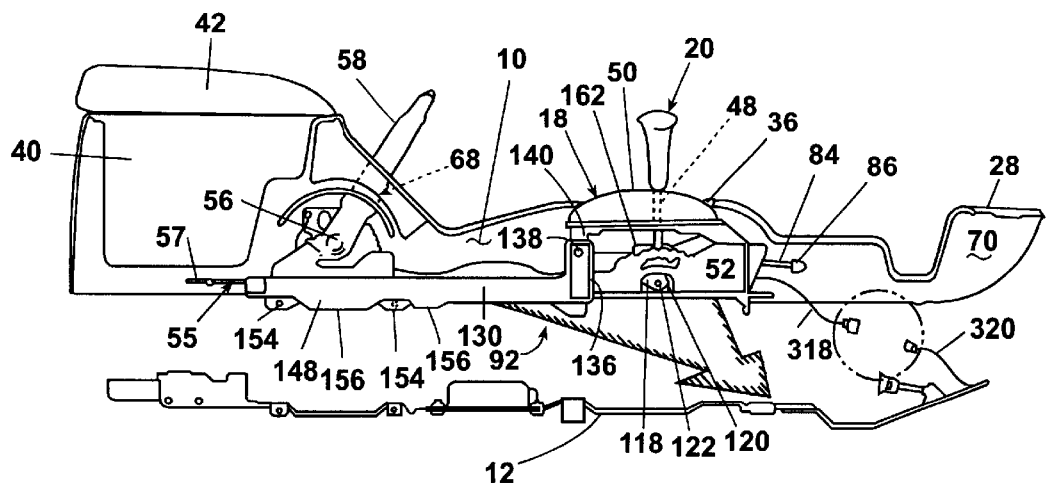
FIG. 3 is an exploded side elevational schematic view of the console and carrier assembly of FIG. 1 moved toward connections on a transmission actuator rod and parking brake cable actuator rod as well as an electrical interconnection for a wire harness for powered components in the console and carrier assembly.

FIG. 3 shows the console assembly 10 being lowered into position above the tunnel reinforcement member 12 whereby a first wire harness cable 318 on the console assembly 10 can be interconnected with a second wire harness cable 320 on the tunnel reinforcement member 12 to operably and electrically interconnect the console assembly 10 to the tunnel reinforcement member 12 on the vehicle interior to provide power to components of the console assembly 10 as needed.

Figure 4:
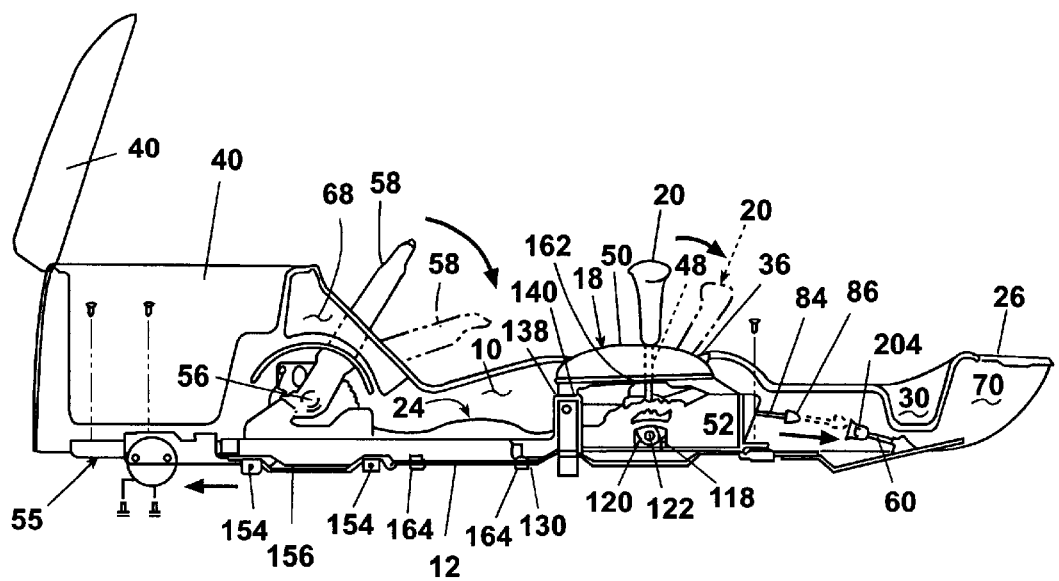
FIG. 4 is a side elevational schematic view showing the location of fasteners which mount the console and carrier assembly of FIG. 1 to the tunnel reinforcement member in the vehicle as well as showing the movement of the transmission shifter rod and parking brake actuator rod toward installation positions whereby quick connections on the shifter mechanism and transmission actuator rod as well as quick connections on the parking brake mechanism and parking brake actuator cable are operably connected to one another by motion of the transmission shifter rod and parking brake actuator rod.

FIG. 4 shows a console assembly 10 placed on the tunnel reinforcement member 12 of the vehicle interior. In this position, the connector 86 on the transmission shifter actuator rod 84 is axially aligned with the connector 204 on the transmission actuator rod 60. Moreover, the connector 57 on the parking brake actuator rod 55 is axially aligned with the connector 274 on the parking brake actuator cable 62.

As shown by the solid lines of the shifter rod 48 of the transmission shifter mechanism 16 and the parking brake lever 58 of the parking brake mechanism 22 and the phantom lines thereof, these outlined positions show the unconnected and connected positions of the transmission shifter mechanism 16 and parking brake mechanism 22.

To interconnect the transmission shifter mechanism 16 and parking brake mechanism 22 to their respective transmission and parking brake components via the connectors 86, 204, 57 and 274, a worker need merely push the shifter knob 20 of the transmission shifter mechanism forwardly so that the actuator rod 84 thereof is urged forwardly. This forward motion of the actuator rod 84 urges the connector 86 of the transmission shifter mechanism 16 into the connector 204 of the transmission actuator rod 60 and quickly interconnects these components as described above with respect to FIGS. 5–6. Further, the parking brake lever 58 of the parking brake mechanism 22 can be rotated clockwise (in the orientation shown in FIG. 4) which, in turn, axially extends the actuator rod 55 thereof. As shown in greater detail in FIGS. 7–8, this extension of the actuator rod 55 also extends the connector 57 attached thereto which is thereby urged within the connector 274 on the parking brake actuator cable 62. Thus, by the rotation of the parking brake lever 58, the connector 57 is mounted within the connector 274 as illustrated in FIGS. 7–8.

Figure 9:
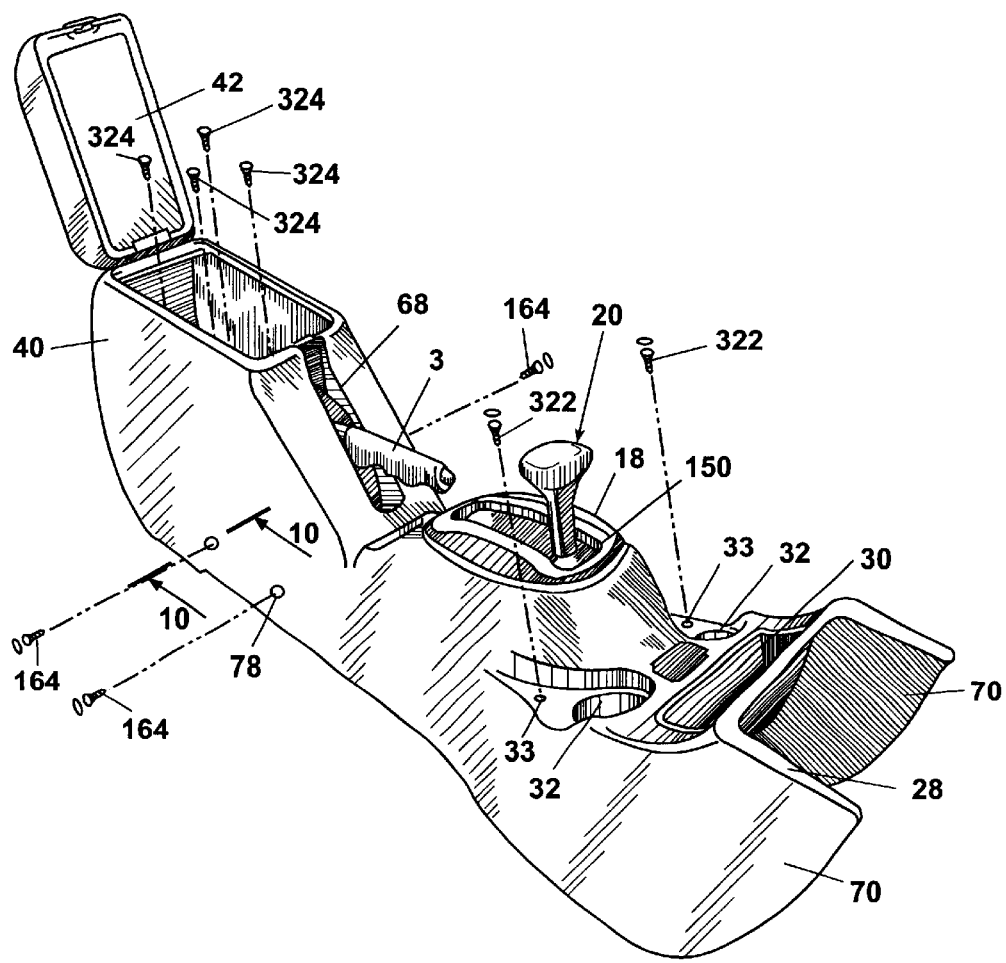
FIG. 9 is a fragmentary perspective view showing the location of several fasteners used to mount the console and carrier assembly of FIG. 1 to the tunnel reinforcement member of the vehicle, thereby securely mounting the transmission shifter mechanism and the parking brake mechanism to the vehicle interior.
Figure 10:
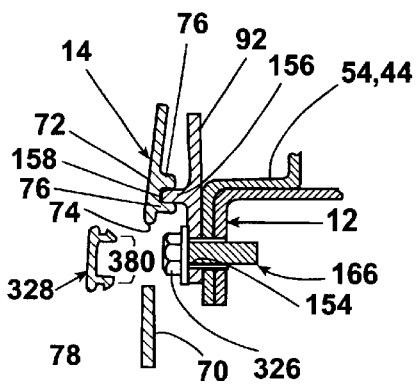
FIG. 10 is an exploded cross-sectional view taken along lines 10—10 of FIG. 9 showing the mounting of a fastener through the carrier assembly of FIG. 1, brackets for the corresponding parking brake and the tunnel reinforcement member of the vehicle interior, a snap-fit interconnection between the console and the carrier as well as a snap-fit cover for the fastener to conceal the fastener head from view.

As shown in FIGS. 9–10, several fasteners 164, 322 and 324 can be mounted to various apertures 78, 33 and within the storage compartment 40, respectively. As shown in FIG. 10, the rail 156 on the carrier 92 has been previously lodged between the protrusion 76 on the rail 72 of the console member 14. As shown by example in FIG. 10, the fastener 164 is mounted through the apertures 154 in the carrier 92, through the corresponding bracket, such as bracket 54, in the parking brake mechanism 22 and through an aperture in the tunnel reinforcement member 12. Preferably, the aperture 78 adjacent the lower edge 74 of the console member 14 is preferably slightly larger than a head portion 326 of the fastener 164 so that the fastener is countersunk within the aperture 78 and retains the carrier 92 to the tunnel reinforcement member 12. A cover 328 sized approximately to that of the aperture 78 in the console member 14, having a detent arm 330 extending therefrom, can be lodged within the aperture 78 to provide a flush outer appearance to the console member 14 and to conceal the fastener 164 mounted therein.

As shown in FIG. 11, the console member 14 can be easily removed to expose the component 16–22 mounted on the carrier 92 for service or replacement as needed. The removal of the console member 14 can be easily accomplished by removing the fasteners 322 from the apertures 33 and the fasteners 324 from the storage compartment 40 so that the rail 72 on the console member 14 can be dislodged from the corresponding rail 156 on the carrier 92. Thus, the console member 14 can be "unsnapped" from its engagement with the carrier 92 to expose the components located therein. The console member 14 can be replaced after servicing by remounting the rail 156 within the rail 72 and mounting the fasteners 322 and 324 as described.

This invention provides some important benefits during the manufacture of a vehicle in an automaker's plant. First, the prior assembly of the console assembly 10 with the components 14–22 mounted on the carrier 92 allows for the console assembly 10 to be manufactured at an off-site manufacturer's facility and shipped to the automaker's plant as a single unit. Thus, only one part need be tracked at the automaker's plant and the off-site manufacturer can be responsible for the prior assembly of the components 14–22 to the carrier 92. Moreover, the automaker, upon receipt of the pre-assembled console assembly 10, can merely mount the console assembly 10 to the tunnel reinforcement member 12 by interconnecting the transmission shifter mechanism 16 to the transmission actuator rod 60 as described with respect to FIGS. 5–6 and the parking brake mechanism 22 to the parking brake actuator cable 62 as described to FIGS. 7–8. These quick connections, coupled with the prior assembly of the components 14–22 to the carrier 92, allow for a more simple and efficient assembly of the these components to the vehicle interior.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A console assembly for mounting to a vehicle support member in an area between a pair of seats and having a first quick connect fastener mounted thereto comprising:
   a carrier adapted to mount to a vehicle support member in an area between the seats;
   an operational lever pivotally mounted on the carrier for movement between first and second positions;
   a second quick connect fastener connected to the operational lever at a lower portion thereof such that the pivotal movement of the operational lever is converted to linear movement of the second quick connect fastener for mating with the first quick connect fastener on the vehicle support member, wherein the second quick connect fastener is maintained in an axially aligned position with respect to the first quick connect fastener when the carrier is mounted on the vehicle support member and the second quick connect fastener is initially mated with the first quick connect fastener when the operational lever is moved from the first position to the second position;
   whereby the console can be assembled as a unit to the vehicle and the operational lever can be assembled to one of a vehicle shifting mechanism and a vehicle braking mechanism through the quick connect fasteners by pivoting the operational lever from the first position to the second position after the carrier is mounted to the vehicle support member, which, in turn, linearly extends the second quick connect fastener toward the first quick connect fastener and interengages the first and second quick connect fasteners when the operational lever reaches the second position.

2. A console assembly according to claim 1 and further comprising a housing mounted to the carrier and covering a portion of the operational lever whereby the housing and carrier can be assembled as a unit to a vehicle and thereafter the operational lever can be assembled to a vehicle transmission.

3. A console assembly according to claim 2 wherein the operational lever comprises a transmission shift lever.

4. A console assembly according to claim 2 wherein the operational lever comprises a parking brake lever mounted to the carrier for pivotal movement between first and second positions and the housing also covers at least a portion of the parking brake lever.

5. A console assembly according to claim 2 wherein the operational lever comprises a transmission shift lever and further comprising a brake lever mounted to the carrier for pivotal movement between first and second positions and the housing also covers at least a portion of the parking brake lever.

6. A console assembly according to claim 5 and further comprising a third quick connect fastener connected to a lower portion of the parking brake lever and the vehicle support member further has a fourth quick connect fastener which is adapted to quick connect to the third quick connect fastener whereby the parking brake lever can be connected to a vehicle parking brake after the housing and parking brake lever are assembled to the vehicle by moving the parking brake lever from the first to the second positions.

7. A console assembly according to claim 2 and further comprising a detent mechanism on the housing and the carrier adapted to releasably retain the housing to the carrier without additional fasteners whereby the detent mechanism provides a releasable engagement between the housing and carrier during transportation thereof.

8. A console assembly according to claim 1 and further comprising a parking brake lever also mounted to the carrier for pivotal movement between first and second positions.

9. A console assembly according to claim 7 and further comprising a third quick connect fastener connected to a lower portion of the parking brake lever and the vehicle support member further has a fourth quick connect fastener which is adapted to quick connect to the third quick connect fastener whereby the parking brake lever can be connected to a vehicle parking brake after the housing and parking brake lever are assembled to the vehicle by moving the parking brake lever from the first to the second positions.

10. A console assembly according to claim 1 wherein the quick connect fastener comprises a first quick connect and a second quick connect, the second quick connect comprises a first flange mounted to the operational lever and the first quick connect comprises a second flange mounted to the shifting/braking mechanism on the vehicle and adapted to receive the first flange, wherein the first flange is received within the second flange when the shift lever is moved from the first position to the second position.

11. A console assembly according to claim 1 wherein one of the first quick connect fastener and the second quick connect fastener comprises at least one opening, and wherein the other of the one of the first quick connect fastener and the second quick connect fastener comprises at least one outwardly-biased detent arm.

12. A console assembly according to claim 11 wherein the detent arm is configured to engage within the at least one opening when the first quick connect fastener is interengaged with the second quick connect fastener.

13. A console assembly for mounting to a portion of a vehicle in an area between a pair of seats, the vehicle having a first quick connect fastener operably interconnected to a vehicle transmission and a second quick connect fastener operably interconnected to a vehicle parking brake, the console assembly comprising:

a carrier adapted to mount to a portion of a vehicle in an area between the seats;

a transmission shift lever pivotally mounted on the carrier for movement between first and second positions, the transmission shift lever having a third quick connect fastener adapted to mate with the first quick connect fastener, the third quick connect fastener movably mounted to the carrier wherein the pivotal movement of the transmission shift lever is converted to linear movement of the third quick connect fastener;

a parking brake lever also mounted to the carrier for pivotal movement between first and second positions, the parking brake lever having a fourth quick connect fastener adapted to mate with the second quick connect fastener, the fourth quick connect fastener movably mounted to the carrier wherein the pivotal movement of the parking brake lever is converted to linear movement of the fourth quick connect fastener;

whereby the assembly of the transmission shift lever, the parking brake lever and the carrier can then be mounted as a unit to the vehicle, and the transmission shift lever and the parking brake lever are respectively interconnected to the vehicle transmission and to the parking brake by simply pivoting the transmission shift lever and the parking brake lever which, in turn, lineraly extends the third and fourth quick connect fasteners into engagement with the first and second quick connect fasteners, respectively.

14. A console assembly according to claim 13 and further comprising a housing adapted to be mounted to the carrier and concealing at least a portion of the transmission shift lever and the parking brake lever.

15. A console assembly according to claim 14 and further comprising a detent mechanism provided on the housing and the carrier adapted to releasably retain the housing to the carrier without additional fasteners whereby the detent mechanism provides a releasable engagement between the housing and carrier during transportation thereof.

16. A console assembly for mounting to a vehicle interior between a pair of vehicle seats, the vehicle interior having a first quick connect fastener operably interconnected to a vehicle transmission and facing the console assembly from a first direction and a second quick connect fastener operably interconnected to a vehicle parking brake and facing the console assembly from a second direction, the console assembly comprising:

a housing having a wall adapted to face the vehicle interior and to be mounted to the vehicle interior, the housing having a first opening and a second opening spaced from the first opening located in the wall;

a transmission shift lever mounted to the housing, and provided with a third quick connect fastener thereon adapted to mate with the first quick connect fastener and having a handle extending from the first opening in the housing, the third quick connect fastener maintained in axial alignment with the first direction;

a parking brake lever mounted to the housing, and provided with a fourth quick connect fastener thereon adapted to mate with the second quick connect fastener and having a handle extending from the second opening in the housing, the fourth quick connect fastener maintained in axial alignment with the second direction;

wherein the third and fourth quick connect fasteners on the transmission shift lever and the parking brake lever, respectively, register with the vehicle transmission and parking brake mechanisms when the housing is located between the pair of vehicle seats so that the transmission shift lever and parking brake lever can be pre-assembled to the housing before installation within the vehicle interior and the handles on the transmission shift lever and the parking brake lever extend from the respective first and second openings for grasping by an operator of the vehicle after the housing is mounted therein, and an initial pivotal movement of the transmission shift lever handle and the parking brake lever handle extend the third and fourth quick connect fasteners into engagement with the.

17. A console assembly according to claim 16 and further comprising a quick connect fastener connectable to the vehicle transmission and adapted to mate with the quick connect fastener on the transmission shift lever.

18. A console assembly according to claim 17 and further comprising a detent mechanism between the quick connect fasteners on the transmission shift lever and the vehicle transmission wherein the detent mechanism provides a releasable engagement between the transmission shift lever and the vehicle transmission upon axial movement of one quick connect fastener toward the other.

19. A console assembly according to claim 18 and further comprising a quick connect fastener connectable to the vehicle parking brake and adapted to mate with the quick connect fastener on the parking brake lever.

20. A console assembly according to claim 19 and further comprising a detent mechanism between the quick connect fasteners on the parking brake lever and the vehicle parking brake wherein the detent mechanism provides a releasable engagement between the parking brake lever and the vehicle parking brake upon axial movement of one quick connect fastener toward the other.

21. In a console assembly for mounting to a vehicle interior support member between a pair of seats and having a quick connect receptor mounted to at least one of a transmission shift cable and a parking brake, the console assembly comprising an assembly having at least one of a transmission shift lever and a parking brake lever mounted thereto, the improvement comprising:

the at least one of a transmission shift lever and a parking brake lever having a quick connection thereon and adapted to be axially aligned with a quick connect receptor on a corresponding one of a transmission actuator and a parking brake actuator when the console assembly is mounted to the vehicle interior support member, and axially engaged within the quick connect receptor on the corresponding one of a transmission actuator and a parking brake actuator when the at least one of the transmission shift lever and the parking brake lever is pivoted relative to the console assembly.

22. The console assembly of claim 21 wherein the quick connection on the at least one of a transmission shift lever and a parking brake lever being connectable to the corresponding quick connection on the one of a transmission actuator and a parking brake actuator by movement of the at least one of a transmission shift lever and a parking brake lever.

23. The console assembly of claim 22 wherein the at least one of a transmission shift lever and a parking brake lever comprises a transmission shift lever and a parking brake lever.

24. In a vehicle with a passenger compartment having a pair of laterally spaced passenger seats and a console assembly located between the seats mounted to a vehicle support member, the console assembly enclosing at least one of a transmission shift lever and a parking brake lever pivotally mounted to the console assembly between a first and a second position, wherein the at least one of a transmission shift lever and a parking brake lever are interconnected to a corresponding transmission and parking brake, an improved console assembly which facilitates installation thereof comprises:

a first quick connect fastener connected to the at least one of a transmission shift lever and a parking brake lever;

a second quick connect fastener connected to the corresponding transmission and parking brake and adapted to mate with the first quick connect fastener;

wherein the second quick connect fastener is axially aligned with the first quick connect fastener when the console assembly is mounted to the vehicle support member, and a mounting between the at least one of a transmission shift lever and a parking brake lever and the corresponding transmission and parking brake is accomplished through the interengagement of the first and second quick connect fasteners without the use of additional tools by moving the at least one of a transmission shift lever and a parking brake lever from the first position to the second position, which, in turn, extends the first quick connect fastener into interengagement with the second quick connect fastener.

25. A vehicle according to claim 24 and further comprising a carrier adapted to mount to the vehicle support member between the seats, wherein the at least one of a transmission shift lever and a parking brake lever is pivotally mounted to the carrier.

26. A vehicle according to claim 25 and further comprising a housing mounted to the carrier and covering a portion of the at least one of a transmission shift lever and a parking brake lever whereby the housing and carrier can be assembled as a unit to the vehicle.

27. A vehicle according to claim 26 wherein the at least one of a transmission shift lever and a parking brake lever comprises a transmission shift lever and a parking brake lever mounted to the carrier for pivotal movement between first and second positions.

28. A vehicle according to claim 27 and further comprising a detent mechanism on at least one of the first and second quick connect fasteners to releasably retain the at least one of a transmission shift lever and a parking brake lever to the corresponding vehicle transmission and parking brake without additional fasteners.

29. A vehicle according to claim 24 and further comprising a detent mechanism on at least one of the first and second quick connect fasteners to releasably retain the at least one of a transmission shift lever and a parking brake lever to the corresponding vehicle transmission and parking brake without additional fasteners.

30. A console assembly according to claim 24 wherein one of the first quick connect fastener and the second quick connect fastener comprises at least one opening, and wherein the other of the one of the first quick connect fastener and the second quick connect fastener comprises at least one outwardly-biased detent arm.

31. A console assembly according to claim 30 wherein the detent arm is configured to engage within the at least one opening when the first quick connect fastener is interengaged with the second quick connect fastener.

32. A method for installing a console assembly within a vehicle interior for operably interconnecting at least one operational lever provided on the console assembly to a vehicle shifting/braking system, the at least one operational lever pivotally mounted to the console assembly for movement between a first position and a second position, comprising the steps of:

providing a first quick connect fastener on the at least one operational lever for linear movement with the pivotal movement of the operational lever between the first and second positions;

providing a second quick connect fastener on the vehicle shifting/braking system and adapted to be releasably interconnected to the first quick connect fastener;

aligning the first and second quick connect fasteners when the console assembly is mounted within the vehicle; and pivotally moving the operational lever from the first position to the second position wherein the first quick connect fastener is linearly extended and engaged within the second quick connect fastener.

33. A method according to claim 32 and farther comprising the step of fixedly mounting the console assembly to the vehicle interior.

34. A method according to claim 32 wherein the console assembly comprises a housing releasably interconnected to a carrier.

35. A method according to claim 34 and further comprising the step of mounting the at least one operational lever to the carrier.

36. A method according to claim 35 and further comprising the step of mounting the carrier to the vehicle interior.

37. A method according to claim 36 wherein the step of mounting the at least one operational lever to the carrier occurs before the step of mounting the carrier to the vehicle interior.

38. A method according to claim 37 wherein the step of mounting the carrier to the vehicle interior occurs before the step of moving the at least one operational lever from the first position to the second position to interconnect the first and second quick connect fasteners.

39. A method according to claim 32 wherein the at least one operational lever comprises a transmission shift lever.

40. A method according to claim 32 wherein the at least one operational lever comprises a parking brake lever.

41. A method according to claim 32 wherein the at least one operational lever comprises a transmission shift lever and a parking brake lever.

* * * * *